R. W. DREW.
Attachment for Sewing Machines.
No. 2,567. Reissued Apr. 16, 1867.
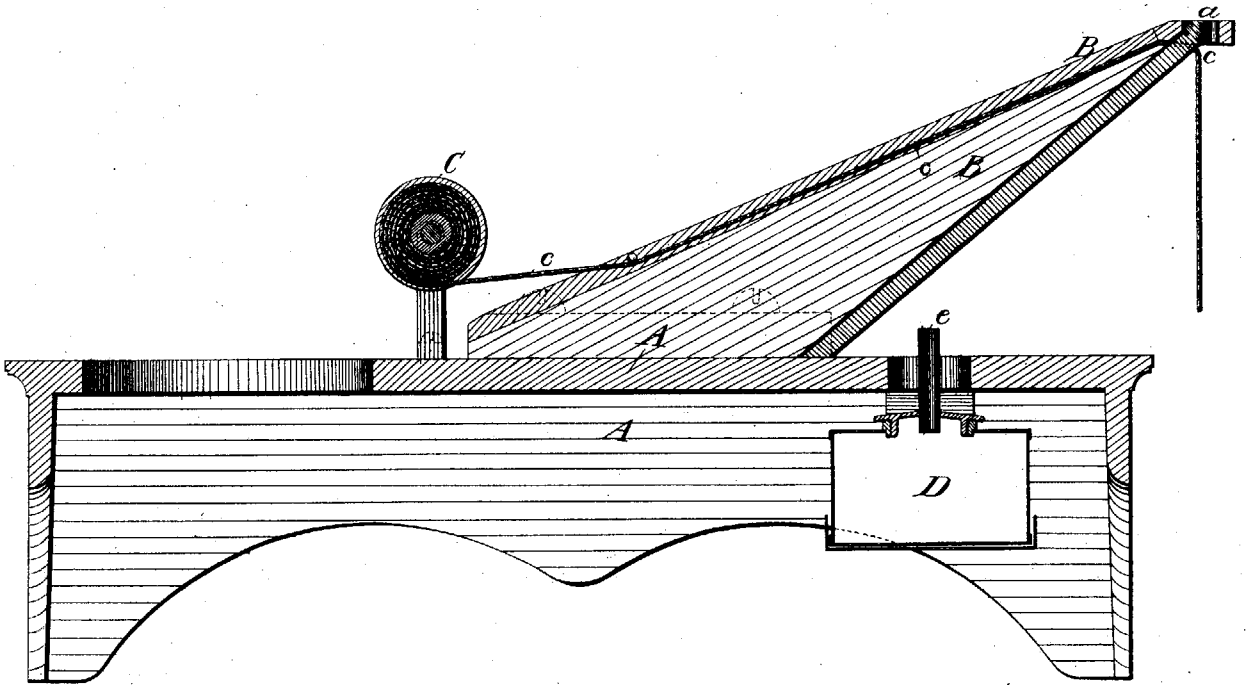
Witnesses:
R. A. Stoughton
Haver: Fendrich.
Inventor:
Reuben W. Drew.
By atty A. B. Stoughton.
THE NORRIS PETERS CO., PHOTO-LITHO., WASHINGTON, D. C.

UNITED STATES PATENT OFFICE.

ALFRED B. ELY, OF NEWTON, MASS., ASSIGNEE OF REUBEN W. DREW.

IMPROVEMENT IN SEWING-MACHINES.

Specification forming part of Letters Patent No. 39,092, dated June 30, 1863; Reissue No. 2,567, dated April 16, 1867.

*To all whom it may concern:*

Be it known that REUBEN W. DREW, of Plymouth, in the State of Massachusetts, invented a new and useful Improvement in Attachments for Waxed-Thread Sewing-Machines; and that the following is a full and clear description of the same, with the accompanying drawing, which represents a section of part of what is known as a "horn machine," for sewing on the soles of boots and shoes.

The object of the invention is to facilitate the use of clear waxed thread in sewing-machines, which requires to be warmed or kept warm in order that it may be sufficiently pliable for use, although it may be used for rendering and keeping pliable threads otherwise waxed.

This invention contemplates an attachment to a sewing-machine using waxed thread that is practical and useful, and enables one to use such thread in any room and temperature.

It consists in the application of heat by the flame of a lamp or gas-burner to the metallic part of a sewing-machine using waxed thread, for the purpose of warming the thread and rendering it pliable as it passes along or through the heated metal.

In the drawing, A represents the base of a sewing-machine, on which is placed a metallic horn, B, over or on which the boot or shoe is placed, the sewing-point being at or near the point *a*.

C is a spool or bobbin, carrying a waxed thread, *c*, which passes along the horn B, in a groove or otherwise, to the sewing-point *a*, where, by well-known devices, it may be interlocked into stitches in or through the article to be sewed.

Under the base or frame A, and under the horn B, is arranged a lamp, D, the wick-tube of which may project up through the base, so that its flame may warm the metal horn sufficiently to warm the wax of the thread or the waxed thread *c*, and render it pliable at the point where it is to be used.

The lamp may be set upon the base, or otherwise, and any flame may be used, so that it shall have its effect upon the horn or arm and warm it sufficiently for the purpose. Fluid or gas flame may be the most convenient. The lamp may be removable or accessible for replenishing or otherwise.

What is claimed, and desired to be secured by Letters Patent, is—

The application of heat by or through the flame of a lamp, gas-burner, or their equivalent, to the metallic arm of a waxed-thread sewing-machine, in or along which the thread may pass, for the purpose of warming the thread and making it pliable, substantially as described.

A. B. ELY.

Witnesses:
P. HANNING,
A. M. STOUT.